United States Patent Office 2,839,925
Patented June 24, 1958

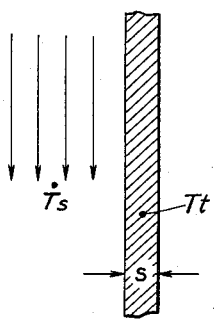
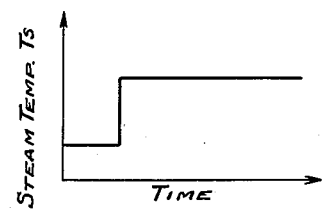
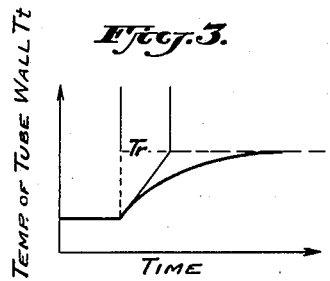
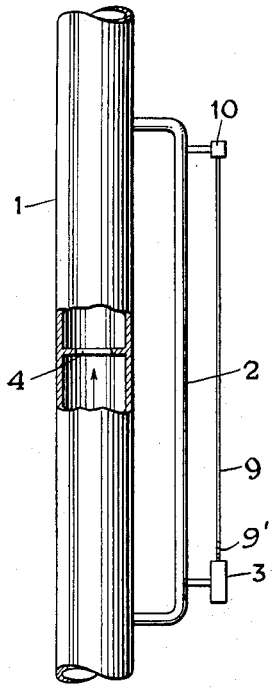
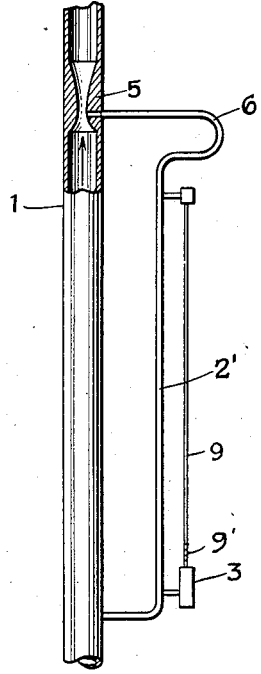
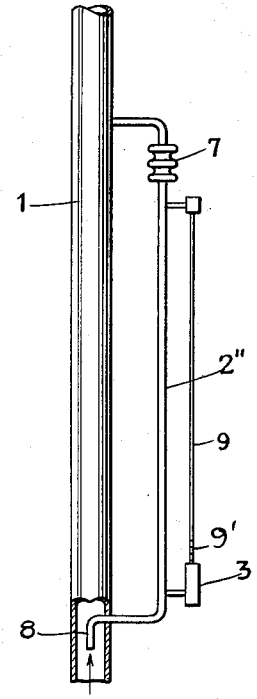
INVENTOR.
PAUL PROFOS.

2,839,925

TEMPERATURE MEASURING SYSTEM

Paul Profos, Winterthur, Switzerland, assignor to Sulzer Frères, Société Anonyme, Winterthur, Switzerland, a corporation of Switzerland Application October 20, 1954, Serial No. 463,457

Claims priority, application Switzerland November 6, 1953

3 Claims. (Cl. 73—363)

The present invention relates to a device for measuring the temperature of a fluid flowing through a tubular element, particularly through thick-walled headers or collecting tubes of steam generators.

For controlling the superheat temperature of steam produced in a steam generator, the steam temperature is usually measured in the header at the inlet and/or at the outlet of the superheater. Quite often it is not the steam temperature that is measured but the temperature of the wall of the header through which the steam flows and this temperature is used for producing an impulse for controlling the superheat temperature. Theoretical considerations as well as practical experience show that changes in temperature of the steam produce delayed changes in the temperature of the tubular element through which the steam flows. This delay depends substantially on the thickness of the tube wall, if all other conditions, particularly steam pressure and velocity, are the same. The delay in temperature indication caused by the heat capacity of the tube wall is quite considerable in thick-walled elements, as are used for collecting tubes and headers of large boiler units. The delay adversely affects the control operation.

It is an object of the present invention to provide a device for measuring the temperature of a fluid flowing through tubes of great wall thickness, whereby the aforedescribed undesirable delays are avoided. According to the invention, a portion of the fluid flowing through the tubular element is deviated into a relatively thin-walled tube by-passing a part of the thick-walled tubular element, and the temperature of the deviated fluid portion or of the thin-walled by-pass tube is measured, the fluid being returned to the fluid flowing in the thick-walled main tubular element. The temperature of the relatively thin-walled by-pass tube is measured in the conventional manner, for example, by measuring the length of the by-pass tube which is different at different temperatures.

One end of the by-pass or measuring tube or conduit is preferably connected to the main conduit ahead of a device restricting the flow area of the main conduit, the other end of the conduit being connected with the main conduit at or after the flow restricting device. The inlet end of the by-pass conduit may be made to extend into the main conduit in a direction against the direction of flow of the fluid in the main conduit. The by-pass or measuring conduit is preferably provided with means for compensating the difference between the heat expansion of the by-pass conduit and of the main conduit.

The novel features which are considered characteristic of the invention are set forth with particularity in the appended claims. The invention itself however and additional objects and advantages thereof will best be understood from the following description of embodiments thereof when read in connection with the accompanying drawing, in which Fig. 1 is a diagrammatic showing of a longitudinal section of the wall of a tube through which steam flows whose temperature must be measured;

Fig. 2 is a diagram illustrating a temperature increase of the steam flowing through a tubular element at a certain period of time;

Fig. 3 is a diagram showing the temperature of the wall of the tube through which the steam flows whose temperature changes according to Fig. 2;

Fig. 4 is a diagrammatic part sectional illustration of a device according to the invention;

Fig. 5 is a diagrammatic part sectional illustration of a modified device according to the invention;

Fig. 6 is a diagrammatic part sectional showing of a further modification of a device according to the invention.

The same numerals designate the same parts in all figures.

Referring more particularly to the drawing, Fig. 1 shows a section through a tube wall of the thickness $s$. The steam flowing through the tube is indicated by arrows and has the temperature $T_s$; the temperature of the tube wall is $T_t$. Assuming that the steam temperature is suddenly raised as shown in Fig. 2, in which the abscissa indicates time and the ordinates indicate the steam temperature $T_s$, the medium temperature $T_t$ of the tube wall will be according to the curve shown in Fig. 3, in which the abscissa indicates time and the ordinates show the temperature $T_t$ of the tube wall. Fig. 3 shows that the temperature of the tube wall comes up only slowly and gradually to the temperature of the steam flowing inside the tube which is indicated in Fig. 3 by a dotted line. The time needed for heating the tube wall to the temperature of the steam flowing through the tube is characterized by a time constant $T_r$. This time constant is approximately proportional to the thickness of the tube wall, all other conditions being equal. The time constant $T_r$ is approximately nine seconds in the case of a high pressure steam tube whose diameter is 76 mm. and whose wall thickness is 6 mm.; the time constant $T_r$ is about 27 seconds in the case of a tube having a diameter of 216 mm. and a wall thickness of 18 mm.

Figs. 4 to 6 illustrate a portion of the tubular conduit through which a liquid or gaseous medium flows in the direction of the arrows.

In the modification shown in Fig. 4, the ends of an expansible by-pass tube 2 which is parallel to and has much smaller dimensions than the tube 1, are connected with the tube 1. A measuring rod 9 has one end rigidly connected, at 10, with the tube 2, the other end of the rod movably extending into an element 3 which is rigidly connected with the tube 2. If the latter expands or contracts due to a change of its temperature the lower end of the rod will move in the element 3. A scale 9' may be provided on the free end of the measuring rod 9 so that the extent of the movement of the element or indicator 3 relatively to the free end of the rod and thereby the contraction and expansion of the conduit 2 can be observed. The rod 9 is preferably made of a material having a very small heat expansion coefficient, such as a metal known as Invar. It is spaced from the hot conduit 2 so that it is unaffected by the temperature of the latter. In order to obtain accurate measurements, the fluid whose temperature is to be measured must flow in sufficient quantity and vigorously through the by-pass tube. This is achieved in the device according to Fig. 4 by connecting the inlet of the by-pass tube ahead of a flow restriction, for example a throttling device 4, and by connecting the other end of the by-pass tube with the main tube 1 after the flow restricting device 4.

In the modification shown in Fig. 5, a venturi nozzle 5 is inserted into the tubular element 1 and the outlet of the by-pass tube 2' is connected with the throat of the venturi nozzle.

In the modification shown in Fig. 6, the by-passed fluid is forced into the by-pass conduit 2" by the dynamic pressure of the fluid flowing through the main conduit 1. The inlet end portion 8 of the by-pass tube 2" is extended into the interior of the tube 1 and against the direction of flow of the fluid through the tube 1.

The small wall thickness of the by-pass conduit which has a relatively small diameter, affords quick expansion and contraction of the by-pass conduit if the temperature of the medium flowing through the tubular element changes and affords accurate indication of temperature variations by means of a rod 9 described supra, even if the fluid flows through tube elements having very heavy walls.

When constructing temperature measuring devices according to the present invention, it must be considered that due to the small dimensions of the by-pass tube, the temperature of the latter will frequently be different from the temperature of the main conduit, and means must be provided for compensating the difference between the heat expansion of the by-pass conduit and that of the main conduit.

If the rectangular bends provided in the modification shown in Fig. 4 are not sufficient for compensating differences in temperature expansion, a compensating bend 6 as shown in Fig. 5 may be provided, or a compensating bellows 7 may be inserted into the measuring tube 2", as shown in Fig. 6.

The temperature measuring systems according to the invention are useful not only for indicating and regulating the superheat temperature of the steam in steam generating plants, but may also be used to advantage for solving problems connected with the supervision of the temperature of gaseous or liquid media which flow through conduits or containers of various other installations.

While specific embodiments of the invention have been shown and described, it will be apparent to those skilled in the art that various changes, modifications, substitutions, additions and omissions may be made therein without departing from the spirit and scope of the invention as set forth in the appended claims.

What is claimed is:

1. A device for indicating the temperature of a medium flowing through a tubular element of relatively great wall thickness comprising, in combination, an expansible conduit of relatively small wall thickness, said conduit having ends connected with the tubular element at points spaced in the flow direction of the medium for by-passing fluid through said conduit, means associated with the tubular element for inducing flow of medium through said conduit, and means connected with said conduit and being responsive to the heat expansion and contraction of said conduit.

2. A device as defined in claim 1 in which said last mentioned means include a measuring rod placed outside of said conduit and made of a material whose heat expansion coefficient is small relatively to the heat expansion coefficient of said conduit, said rod having an end rigidly connected with said conduit substantially at one end of said conduit, and an indicating device rigidly connected with said conduit substantially at the other end of said conduit said rod having a free end operatively associated with said device for indicating the extent of displacement of said free end relatively to said conduit.

3. A device as defined in claim 1 in which said last mentioned means include a measuring rod placed outside of, parallel to, and in spaced relation to said conduit and being substantially unaffected by the temperature of said conduit, said rod having an end rigidly connected with said conduit substantially at one end of said conduit, and a reference member rigidly connected with said conduit substantially at the other end of said conduit, said rod having a calibrated free end associated with said reference member for indicating the heat expansion of said conduit.

References Cited in the file of this patent

UNITED STATES PATENTS

| | | |
|---|---|---|
| 212,758 | Sprod | Feb. 25, 1879 |
| 787,494 | Burnell et al. | Apr. 18, 1905 |
| 797,027 | Tilden | Aug. 15, 1905 |
| 1,062,292 | McNab | May 20, 1913 |
| 1,334,960 | Mungall | Mar. 30, 1920 |
| 2,367,176 | Ahlstrom | Jan. 16, 1945 |

OTHER REFERENCES

Mechanical Engineers' Handbook by Lionel S. Marks, 4th edition, published by McGraw Hill Book Company, 1941, pp. 1067, 1068, 1069 and 1095.